US012607458B2

(12) United States Patent
Fang et al.

(10) Patent No.: US 12,607,458 B2
(45) Date of Patent: Apr. 21, 2026

(54) FIBER BRAGG GRATING CURVATURE SENSING TEST DEVICE AND TEST METHOD THEREOF

(71) Applicant: China University of Mining and Technology, Xuzhou (CN)

(72) Inventors: Xinqiu Fang, Xuzhou (CN); Yang Song, Xuzhou (CN); Ningning Chen, Xuzhou (CN); Haotian Feng, Xuzhou (CN); Minfu Liang, Xuzhou (CN); Gang Wu, Xuzhou (CN); Ziyue Xu, Xuzhou (CN); Fukang Qiao, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 118 days.

(21) Appl. No.: 18/889,417

(22) Filed: Sep. 19, 2024

(65) Prior Publication Data

US 2026/0079003 A1 Mar. 19, 2026

(51) Int. Cl.
| | |
|---|---|
| *G01B 11/24* | (2006.01) |
| *G01B 11/16* | (2006.01) |
| *G01L 1/24* | (2006.01) |

(52) U.S. Cl.
CPC ............ *G01B 11/24* (2013.01); *G01B 11/165* (2013.01); *G01L 1/246* (2013.01)

(58) Field of Classification Search
CPC ....... G01B 11/24; G01B 11/165; G01B 11/18; G01B 11/16; G01L 1/246; G01D 5/35316
See application file for complete search history.

(56) References Cited

U.S. PATENT DOCUMENTS

| | | | | |
|---|---|---|---|---|
| 2004/0035216 A1* | 2/2004 | Morrison | ............... | G01B 11/18 |
| | | | | 73/800 |
| 2010/0039102 A1* | 2/2010 | Hoelzl | ................... | G01B 21/16 |
| | | | | 324/207.11 |

FOREIGN PATENT DOCUMENTS

| | | | | | |
|---|---|---|---|---|---|
| CN | 111023989 A | * | 4/2020 | .......... | G01B 11/165 |
| JP | 2022134840 A | * | 9/2022 | | |
| WO | WO-2015044930 A1 | * | 4/2015 | ............. | A61B 5/103 |

\* cited by examiner

*Primary Examiner* — Abdullahi Nur

(74) *Attorney, Agent, or Firm* — Bayramoglu Law Offices

(57) ABSTRACT

An FBG curvature sensing test device and a test method thereof are provided. The test device includes a test platform, an FBG demodulator, and a computer. The test platform includes an optical plate and two constraint components, test pieces are connected between two constraint components, where the constraint component includes an X-axis displacement stage, a Z-axis rotation stage and a fixture, the X-axis displacement stage is connected to the optical plate and can move along an X-axis direction, one end of the Z-axis rotation stage is connected to the X-axis displacement stage, and the other end of the Z-axis rotation stage is connected to the fixture; the FBG demodulator is configured to convert an optical signal of a wavelength change monitored by the FBG test line based on the deformation of the test piece into an electrical signal; the computer is coupled to the FBG demodulator.

14 Claims, 15 Drawing Sheets

FIBER BRAGG GRATING CURVATURE SENSING TEST DEVICE AND TEST METHOD THEREOF

TECHNICAL FIELD

The present invention relates to the field of fiber Bragg grating (FBG) curvature sensing, in particular to an FBG curvature sensing test device and a test method thereof.

BACKGROUND

The FBG curvature sensor has the advantages of simple principle, high sensitivity, high precision, anti-electromagnetic interference, and passive work, which has been widely used in medical catheter intervention, aerospace structure monitoring, soft robot shape monitoring, and other fields. Because the inversion and reconstruction of the two-dimensional bending shape of the FBG curvature sensor is related to the position of the FBG test line, the sensing error will occur when the FBG test line rotates or twists the angle, currently the accuracy compensation of the FBG curvature sensor has been reported. At present, in order to realize the FBG curvature sensing test, the cantilever beam test method is mostly used to fix one end of the test piece, and the other end is loaded by weight loading to make the test piece produce two-dimensional bending. This device and method make it difficult to realize the specific curvature bending of the test piece, and it is difficult to carry out the accuracy compensation test of the two-dimensional bending superposition torsion angle of the test piece, in addition, the measurement accuracy of this method is low and the error is large. In order to realize the adjustable curvature and twist angle of the test piece in the process of FBG curvature sensing test, it is urgent to propose a new type of FBG curvature sensing test device and test method thereof.

SUMMARY

Aiming at the problems and requirements mentioned above, the scheme proposes an FBG curvature sensing test device and a test method thereof, the above technical purposes can be realized due to the following technical features are adopted, and a number of other technical effects can be brought.

An objective of the present invention is to propose an FBG curvature sensing test device, comprising:

a test platform comprises an optical plate and two constraint components arranged at two relative positions on the optical plate along a Y-axis direction, test pieces are connected between two constraint components, wherein the constraint component comprises an X-axis displacement stage, a Z-axis rotation stage and a fixture, the X-axis displacement stage is connected to the optical plate and can move along an X-axis direction, one end of the Z-axis rotation stage is connected to the X-axis displacement stage, and the other end of the Z-axis rotation stage is connected to the fixture, and is configured to drive the fixture to rotate around the Z-axis direction, the fixture is configured as a fixed connection to the test piece; the test piece is an elastic material piece;

an FBG demodulator, the FBG demodulator is connected to a surface of the test piece through an FBG test line, and is configured to convert an optical signal of a wavelength change monitored by the FBG test line based on the deformation of the test piece into an electrical signal;

a computer, the computer is coupled to the FBG demodulator, and is configured to receive the electrical signal converted by the FBG demodulator, and performs reconstruction and data acquisition of a bending shape of the test piece;

wherein the X-axis direction, Y-axis direction and Z-axis direction are perpendicular to each other.

In this technical scheme, when the test is carried out on the test device, firstly, the position of the two constraint components is adjusted on the optical plate, so that the two constraint components are arranged along the Y-axis direction at intervals, and the fixtures of the two constraint components are on the same axis; secondly, the test piece is mounted on the fixture of two constraint components, and the test piece is fixed by two fixtures; wherein the two ends of the test piece have the same angle index value on the fixture and do not undergo relative torsion or the two ends of the test piece undergo relative torsion; thirdly, one of the constraint components is configured as a fixed end, and the other constraint component is configured as an active end, wherein a displacement of the fixed end is kept to be zero in all directions, and the active end is moved along the X-axis direction and the test piece is presented in a two-dimensional bending state; continue to adjust the Z-axis rotation stage of the active end constraint component to correspond to the bending state of the test piece; finally, the bending shape of the test piece is performed reconstruction and data acquisition by a computer, and compared with the two-dimensional projection curve of the test piece on the optical plate to determine a reduction accuracy of curvature information of the test piece; wherein, except for the test conditions where the angle index of the two ends of the test piece on the fixture is zero and the relative torsion does not occur, other test conditions also comprise: a precision compensation is carried out by the computer, and compared with the two-dimensional projection curve of the test piece on the optical plate and the curve before precision compensation to determine the reduction accuracy and compensation effect of the curvature information of the test piece. Compared with the conventional cantilever beam test device and method, the specific curvature bending of the test piece can be realized by the above FBG curvature sensing test device, meanwhile, the rotation angle and torsion angle of the test piece in the two-dimensional bending state can be adjusted, which is conducive to carry out a accuracy compensation test of the two-dimensional bending superposition torsion angle of the test piece; in addition, the test device effectively suppresses an axial tension of the test piece and improves the measurement accuracy.

In addition, according to the FBG curvature sensing test device of the present invention, it can also have the following technical features:

in one example of the present invention, the Z-axis rotation stage comprises:

a base, the base is fixedly connected to the X-axis displacement stage;

a rotating disc, which can be pivotally connected to the base, and the fixture is fixedly connected to the rotating disc;

a driving member, the driving member is connected to the rotating disc and configured to drive the rotating disc in a rotational movement relative to the base.

In one example of the present invention, the driving member comprises:

a screw and a first connecting block, the first connecting block is fixedly connected to the screw;

a threaded hole is formed on the base, and the screw is adapted to the threaded hole;

wherein a driving shaft is fixed on the rotating disc, and a first slot matching the driving shaft is arranged along a circumferential direction of the first connecting block.

In one example of the present invention, the driving member comprises:

a sliding rod and a second connecting block, the second connecting block is fixedly connected to the sliding rod, and a convex part is arranged on the sliding rod; wherein the driving shaft is fixed on the rotating disc, and a second slot is arranged on the second connecting block to adapt to the driving shaft;

a sliding rail is formed on the base, and a plurality of concave parts are arranged inside the sliding rail, and the convex part is clamped to any concave part in the sliding rail.

In one example of the present invention, the Z-axis rotation stage further comprises:

a limiting member, the limiting member is connected between the base and the rotating disc and configured to be capable of a switching movement between a first position limiting a rotational movement of the rotating disc relative to the base and a second position releasing the rotational movement of the rotating disc relative to the base.

In one example of the present invention, an angle index is formed in the circumferential direction of the fixture, when the test piece is fixedly mounted between the two fixtures, both ends of the test piece can be fixed at the specified torsion angle and/or rotation angle.

In one example of the present invention, the FBG test line is arranged along an extension direction of the test piece, and a plurality of grating detection points are formed on a surface of the test piece by bonding a binder at equal intervals.

Another purpose of the present invention is to propose a test method for an FBG curvature sensing test device as described above, comprising the following steps:

S11: adjusting a position of the two constraint components on the optical plate, so that the two constraint components are arranged along the Y-axis direction at intervals, and the fixtures of the two constraint components are on the same axis;

S12: mounting the test piece on the fixture of two constraint components, and fixing the test piece through two fixtures; wherein the two ends of the test piece are equal in the angle index value on the fixture and the relative torsion does not occur;

S13: configuring one of the constraint components as the fixed end, and configuring the other constraint component as the active end, wherein the displacement of the fixed end is kept to zero, and moving the active end along the X-axis direction and making the test piece to present a two-dimensional bending state;

S14: adjusting the Z-axis rotation stage of the active end constraint component to correspond to the bending state of the test piece;

S15: performing reconstruction and data acquisition of the bending shape of the test piece by the computer, and comparing with the two-dimensional projection curve of the test piece on the optical plate to determine the reduction accuracy of curvature information of the test piece.

In one example of the present invention, when the angle of the two ends of the test piece on the fixture is non-zero, after step S15, it further comprises:

carrying out the precision compensation by the computer, and comparing with the two-dimensional projection curve of the test piece on the optical plate and the curve before precision compensation to determine the reduction accuracy and compensation effect of the curvature information of the test piece.

Another objective of the present invention is to propose a test method for the FBG curvature sensing test device as described above, comprising the following steps:

S21: adjusting a position of the two constraint components on the optical plate, so that the two constraint components are arranged along the Y-axis direction at intervals, and the fixtures of the two constraint components are on the same axis;

S22: mounting the test piece on the fixture of two constraint components, and at both ends of the test piece, wherein twisting one end at a specified angle relative to the other end, and fixing both ends of the test piece by two fixtures;

S23: configuring one of the constraint components as the fixed end, and configuring the other constraint component as the active end, wherein the displacement of the fixed end is kept to zero, and moving the active end along the X-axis direction and making the test piece to present a two-dimensional bending state and a torsion state;

S24: adjusting the Z-axis rotation stage of the active end constraint component to correspond to the bending state of the test piece;

S25: performing reconstruction and data acquisition of the bending shape of the test piece by the computer, and comparing with the two-dimensional projection curve of the test piece on the optical plate to determine the reduction accuracy of curvature information of the test piece.

S26: carrying out the precision compensation by the computer, and comparing with the two-dimensional projection curve of the test piece on the optical plate and the curve before precision compensation to determine the reduction accuracy and compensation effect of the curvature information of the test piece.

In the following, the optimal embodiment of the present invention will be described in more detail in combination with the attached drawings, so that the characteristics and advantages of the present invention can be easily understood.

BRIEF DESCRIPTION OF THE DRAWINGS

In order to clarify the technical scheme of the embodiment of the present invention more clearly, the drawings of the embodiment of the present invention are briefly introduced below. The drawings are used only to show some embodiments of the present invention, not to limit all embodiments of the present invention to them.

Figure 1:
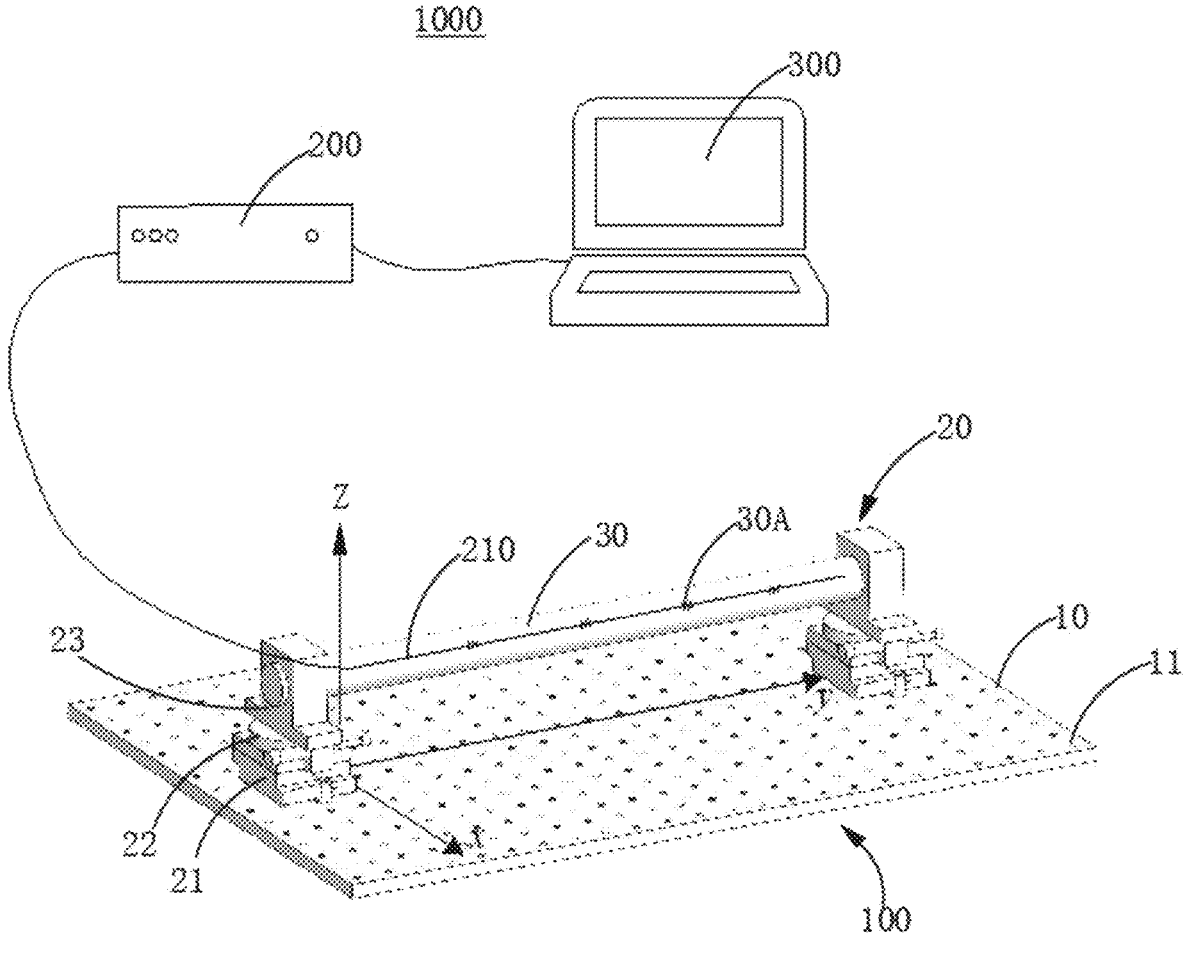
FIG. 1 is a structure diagram of an FBG curvature sensing test device according to the embodiment of the present invention.
Figure 2:
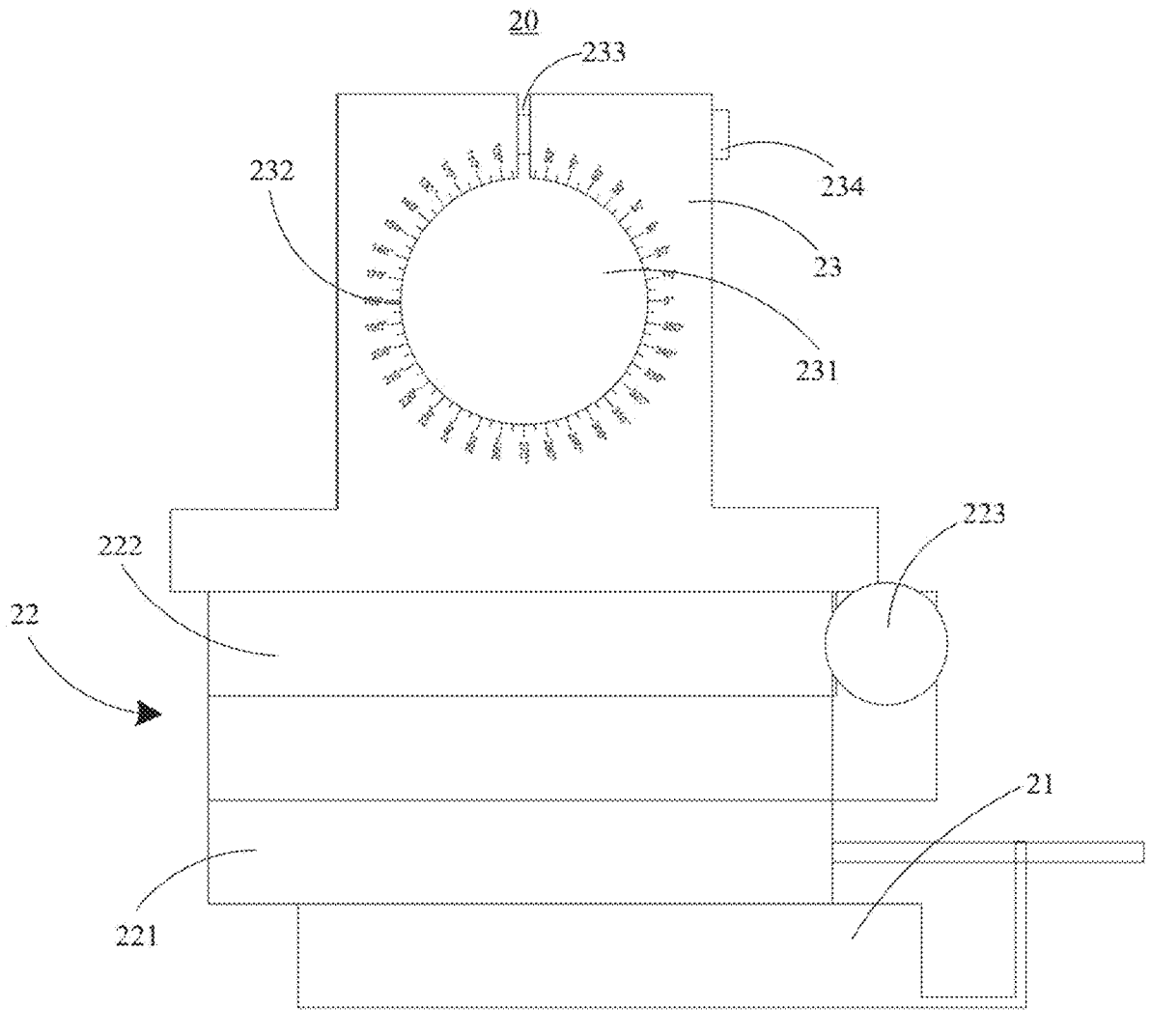
FIG. 2 is a side view of an FBG curvature sensing test device according to the embodiment of the present invention.
Figure 3:
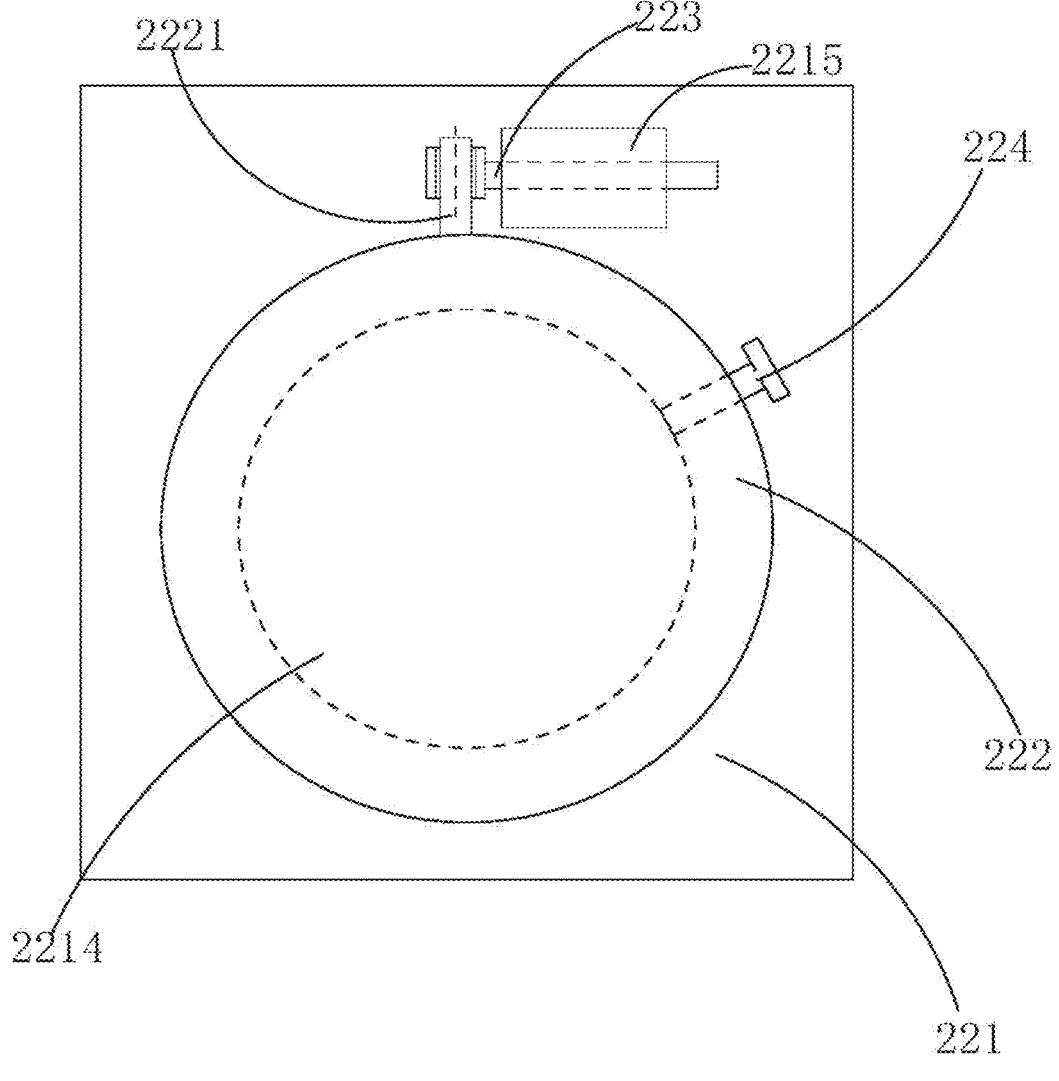
FIG. 3 is a top view of a Z-axis rotation stage according to the embodiment of the present invention.
Figure 4:
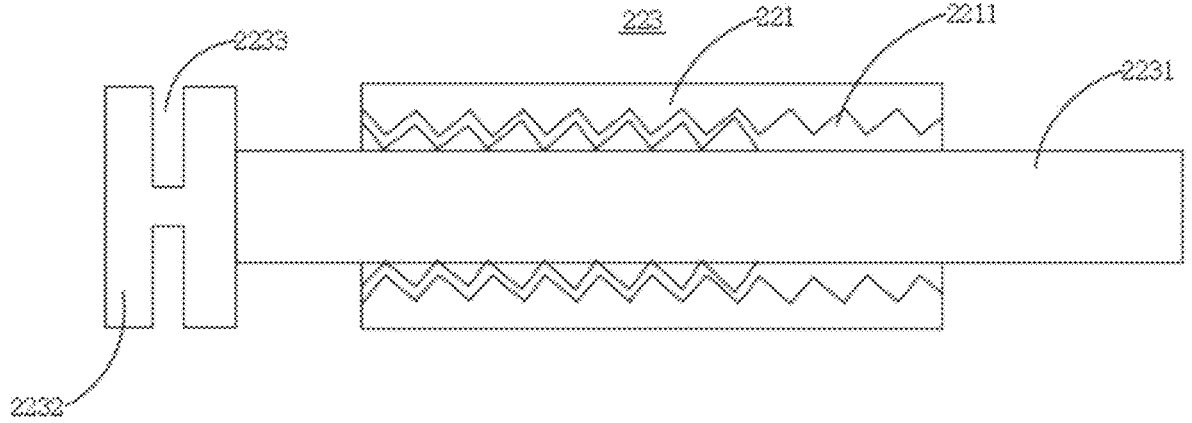
FIG. 4 is a structural schematic diagram of a driving member according to one of the embodiments of the present invention.
Figure 5:
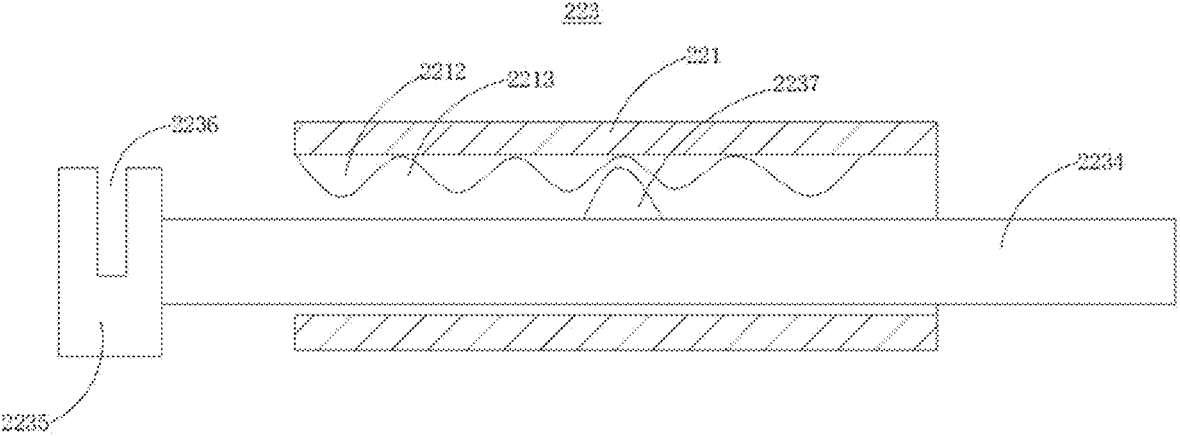
FIG. 5 is a structural schematic diagram of a driving member according to another embodiment of the present invention.

LIST OF REFERENCE NUMERALS a test device 1000;
a test platform 100;
an optical plate 10;
a first positioning hole 11;
a constraint component 20;
an X-axis displacement stage 21;
a Z-axis rotation stage 22;
a base 221;
a threaded hole 2211;
a sliding rail 2212;
a concave part 2213;
a rotating shaft 2214;
a connecting platform 2215;
a rotating disc 222;
a driving shaft 2221;
a driving member 223;
a screw 2231;
a first connecting block 2232;
a first slot 2233;
a sliding rod 2234;
a second connecting block 2235;
a second slot 2236;

a convex part 2237;
a limiting member 224;
a fixture 23;
a mounting hole 231;
an angle index 232;
a notch 233;
a bolt member 234;
a test piece 30;
a grating detection point 30A;
an FBG demodulator 200;
an FBG test line 210;
a computer 300.

DETAILED DESCRIPTION OF THE EMBODIMENTS

In order to make the objectives, the technical solutions, and the advantages of the present invention clearer, the following clearly and completely describes the technical solutions in embodiments of the present invention with reference to the drawings of embodiments of the present invention. Identical drawing symbols in the accompanying drawings represent identical parts. It should be noted that the described embodiments are only some but not all of the embodiments of the present invention. All other embodiments obtained by those of ordinary skill in the art based on the embodiments of the present invention without involving any creative effort shall fall within the scope of protection of the present invention.

Unless otherwise defined, the technical or scientific terms used in the present invention shall be those to which the present invention belongs. As used herein, the terms "first", "second", and the like used in the present invention patent application specification and the claim do not denote any order, quantity, or importance, but rather are used to distinguish one element from another. Similarly, similar words such as 'one' or 'a' do not necessarily mean quantity limitation. Similar words such as "comprise" or "include" means that the elements or items preceding the word encompass the elements or items listed after the word and equivalents thereof, but do not exclude other elements or items. Similar terms such as 'connected' or 'connecting' are not limited to physical or mechanical connections, but can include electrical connections, whether direct or indirect. "Up", "down", "left", "right", etc. are only used to indicate a relative positional relationship, which may change accordingly when the absolute position of the object being described changes.

According to a first aspect of the present invention, an FBG curvature sensing test device 1000 is shown in FIGS. 1 to 5, comprising:

a test platform 100 comprises an optical plate 10 and two constraint components 20 arranged at two relative positions on the optical plate 10 along a Y-axis direction, test pieces 30 are connected between two constraint components 20, wherein the constraint component 20 comprises an X-axis displacement stage 21, a Z-axis rotation stage 22 and a fixture 23, the X-axis displacement stage 21 is connected to the optical plate 10 and can move along an X-axis direction, one end of the Z-axis rotation stage 22 is connected to the X-axis displacement stage 21, and the other end of the Z-axis rotation stage is connected to the fixture 23, and is configured to drive the fixture 23 to rotate around the Z-axis direction, the fixture 23 is configured as a fixed connection to the test piece 30; the test piece 30 is an elastic material piece;

an FBG demodulator 200, the FBG demodulator is connected to a surface of the test piece 30 through an FBG test line 210, and is configured to convert an optical signal of a wavelength change monitored by the FBG test line 210 based on the deformation of the test piece 30 into an electrical signal; that is, the FBG test line 210 is pasted on the surface of the test piece 30 by the binder, and the wavelength change signal caused by the strain is generated due to the deformation of the test piece.

A computer 300, the computer is coupled to the FBG demodulator 200, and is configured to receive the electrical signal converted by the FBG demodulator 200, and performs reconstruction and data acquisition of a bending shape of the test piece 30;

wherein the X-axis direction, Y-axis direction and Z-axis direction are perpendicular to each other.

Specifically, when the test is carried out on the test device 1000, firstly, the position of the two constraint components 20 is adjusted on the optical plate 10, so that the two constraint components 20 are arranged along the Y-axis direction at intervals, and the fixtures 23 of the two constraint components 20 are on the same axis; secondly, the test piece 30 is mounted on the fixture 23 of two constraint components 20, and the test piece 30 is fixed by two fixtures 23; wherein the two ends of the test piece have the same angle index 232 value on the fixture 23 and do not undergo relative torsion or the two ends of the test piece 30 undergo relative torsion; thirdly, one of the constraint components 20 is configured as a fixed end, and the other constraint component 20 is configured as an active end, wherein a displacement of the fixed end is kept to be zero in all directions, and the active end is moved along the X-axis direction and the test piece 30 is presented in a two-dimensional bending state; continue to adjust the Z-axis rotation stage 22 of the active end constraint component 20 to correspond to the bending state of the test piece 30; finally, the bending shape of the test piece 30 is performed reconstruction and data acquisition by a computer 300, and compared with the two-dimensional projection curve of the test piece 30 on the optical plate 10 to determine a reduction accuracy of curvature information of the test piece 30; wherein, except for the test conditions where the angle index 232 of the two ends of the test piece 30 on the fixture 23 is zero and the relative torsion does not occur, other test conditions also comprise: a precision compensation is carried out by the computer 300, and compared with the two-dimensional projection curve of the test piece 30 on the optical plate 10 and the curve before precision compensation to determine the reduction accuracy and compensation effect of the curvature information of the test piece 30. Compared with the conventional cantilever beam test device 1000 and method, the specific curvature bending of the test piece 30 can be realized by the above FBG curvature sensing test device, meanwhile, the rotation angle and torsion angle of the test piece 30 in the two-dimensional bending state can be adjusted, which is conducive to carry out an accuracy compensation test of the two-dimensional bending superposition torsion angle of the test piece; in addition, the test device 1000 effectively suppresses an axial tension of the test piece 30 and improves the measurement accuracy.

In one example of the present invention, the Z-axis rotation stage 22 comprises:

a base 221, the base is fixedly connected to the X-axis displacement stage 21;

a rotating disc 222, which can be pivotally connected to the base 221, and the fixture 23 is fixedly connected to the rotating disc 222;

a driving member 223, the driving member is connected to the rotating disc 222 and configured to drive the rotating disc 222 in a rotational movement relative to the base 221;

in short, the rotating disc 222 is driven by the driving member 223 to rotate around the base 221, thereby driving the rotation of the fixture 23 connected with the rotating disc 222.

For example, a rotating shaft 2214 is arranged on the base 221, and a pivot hole is arranged on the rotating disc 222 to match the rotating shaft 2214, when the rotating disc 222 is adapted to the base 221, the rotating disc 222 is limited to the rotating shaft 2214 of the base 221 through a bolt fastener, so that the rotating disc 222 can be rotationally driven along the circumferential direction of the rotating shaft 2214 of the base 221, and then realize the driving of the fixture 23 on the rotating disc 222.

It should be noted that the rotation drive of fixture 23 is intended for the process of the movement of the X-axis displacement stage 21 along the X-axis direction, a mounting hole 231 on fixture 23 of the moving constraint component 20 is not on the same line as the mounting hole 231 on the fixture 23 of the other constraint component 20, while the rotation of the Z-axis rotation stage 22 enables the mounting hole 231 on the two constraint components 20 to be always on the same line.

In one example of the present invention, the driving member 223 comprises:

a screw 2231 and a first connecting block 2232, the first connecting block 2232 is fixedly connected to the screw 2231;

a threaded hole 2211 is formed on the base 221, and the screw 2231 is adapted to the threaded hole 2211; for example, a connecting platform 2215 is arranged on the base 221 and near the rotating disc 222, and the threaded hole 2211 is arranged on the connecting platform 2215;

wherein, a driving shaft 2221 is fixed on the rotating disc 222, and a first slot 2233 matching the driving shaft 2221 is arranged along a circumferential direction of the first connecting block 2232.

For example, a knob is arranged at one end of screw 2231, and screw 2231 is moved to the side of the coaxially arranged threaded hole 2211 by rotating the knob, because the driving shaft 2221 of the rotating disc 222 is clamped in the first slot 2233, the connecting block drives the rotating disc 222 to rotate.

Through the above embodiment, the effective drive of the rotating disc 222 can be realized, so as to facilitate the adjustment of an orientation of the fixture 23.

In one example of the present invention, the driving member 223 comprises:

a sliding rod 2234 and a second connecting block 2235, the second connecting block 2235 is fixedly connected to the sliding rod 2234, and a convex part is arranged on the sliding rod 2234; wherein the driving shaft 2221 is fixed on the rotating disc 222, and a second slot 2236 is arranged on the second connecting block 2235 to adapt to the driving shaft 2221;

a sliding rail 2212 is formed on the base 221, and a plurality of concave parts 2213 are arranged inside the sliding rail 2212, and the convex part 2237 is clamped to any concave part 2213 in the sliding rail 2212;

for example, the concave part 2213 that is arranged inside the sliding rail 2212 is formed by the bending of a shrapnel; a handle is arranged at one end of the sliding rod 2234, so that the convex part 2237 can cooperate with any concave part 2213 when driving the sliding rod 2234, wherein, during the movement and coordination of the convex part 2237 and one of the concave part 2213, the convex part 2237 squeezes the concave to make it deform and then moves to the next concave part 2213.

In one example of the present invention, the Z-axis rotation stage 22 further comprises:

a limiting member 224, the limiting member 224 is connected between the base 221 and the rotating disc 222 and configured to be capable of a switching movement between a first position limiting rotational movement of the rotating disc 222 relative to the base 221 and a second position releasing rotational movement of the rotating disc 222 relative to the base 221;

the position of the rotating disc 222 can be effectively fixed by setting a limit line, so as to avoid the rotation of the rotating disc 222 during the test process and affect the test, which is conducive to improving the test accuracy of the test device 1000.

For example, the limiting member 224 is a stud member, and the threaded hole 2211 is arranged on the rotating disc 222, a bolt member is adapted to the threaded hole 2211, when it is necessary to fix the relative position of the rotating disc 222 and the base 221 through the limiting member 224, the end face of limiting member is offset from the base 221 by screwing the stud member, when it is necessary to release the rotating disc 222 through the limiting member 224, the end face of limiting member is separated from the base 221 by screwing the stud member.

In one example of the present invention, an angle index 232 is formed in the circumferential direction of fixture 23, when the test piece 30 is fixedly mounted between the two fixtures 23, both ends of the test piece 30 can be fixed at the specified torsion angle and/or rotation angle.

That is, the angle index 232 is marked on the circumferential direction of the mounting hole 231 of each fixture 23, and the test condition of the test piece 30 can be accurately controlled by setting the angle index 232; for example 1, both ends of the test piece 30 are located at zero rotation angle; for example 2, both ends of the test piece 30 are located at a rotation angle of 10 degrees; for example 3, one of the both ends of the test piece 30 is located at a rotation angle of zero, and the other end is located at a torsion angle of 10 degrees; for example 4, one of the both ends of the test piece 30 is located at a rotation angle of 10 degrees, and the other end is located at a torsion angle of 20 degrees.

In one example of the present invention, the FBG test line 210 is arranged along an extension direction of the test piece 30, and a plurality of grating detection points 30A is formed on the surface of the test piece 30 by bonding a binder at equal intervals.

The deformation change of test piece 30 can be accurately monitored by arranging the FBG test line 210 along the extension direction of test piece 30, and then the optical signal of the wavelength change caused by the monitored strain can be converted into an electrical signal.

In one example of the present invention, the optical plate 10 is connected with the X-axis displacement stage 21 by a fastener.

A plurality of first positioning holes 11 are arranged at least along the X-axis direction of the optical plate 10;

the X-axis displacement stage 21 is provided with a plurality of second positioning holes;

a plurality of second positioning holes are connected to the corresponding a plurality of first positioning holes 11, and the fasteners are sequentially penetrated the first positioning hole 11 and the second positioning hole;

Preferably, the first positioning hole 11 is arrayed along the X-axis direction and Y-axis direction on the optical plate 10. For example, the optical plate 10 has a threaded hole with a pitch of 25 mm*25 mm, which can be used to fix constraint component 20 and determine the two-dimensional coordinates.

Through the above structure, the X-axis displacement stage 21 can move along the X-axis direction on the optical plate 10, so as to realize the adjustment of the bending state of the test piece 30.

Preferably, the X-axis displacement stage 21 can also be a telescopic member, which can comprise a cylinder body and a piston plate that can be telescopic in the cylinder body, the cylinder body is connected to the optical plate 10 through the above fastener, the piston plate is fixedly connected to the Z-axis rotation stage 22, so that when the movement of the X-axis direction is required, it can be realized by the telescopic of the X-axis displacement stage 21, or realized by the fastener connection between the cylinder body and the optical plate 10.

Understandably, when displacement needs to be adjusted is greater than the spacing of the first positioning hole 11 of the optical plate 10, it is achieved by adjusting the fixed position of the X-axis displacement stage 21 on the optical plate 10; when displacement needs to be adjusted is smaller than the spacing of the first positioning hole 11 of the optical plate 10, it is achieved by adjusting the X-axis displacement stage 21 to perform an extension action.

In one example of the present invention, the fixture 23 comprises a mounting hole 231 running through the fixture 23 and a notch 233 arranged on the fixture 23 and communicated with the mounting hole 231; wherein, the bolt member 234 is connected to the notch 233 of the fixture 23, the tightness of the notch 233 is adjusted through the bolt member 234 to fix or release the test piece 30;

that is, a connecting hole is arranged on the fixture 23, and the connecting hole is penetrated the notch 233, and the bolt member 234 is connected in the connecting hole, the gap size of the notch 233 is adjusted by the bolt member 234 to adjust an inner diameter of the mounting hole 231, and finally, the tightness adjustment of the test piece 30 is realized.

According to a second aspect of the present invention, a test method for an FBG curvature sensing test device 1000 as described above, comprising the following steps:

S11: a position of the two constraint components 20 is adjusted on the optical plate 10, so that the two constraint components 20 are arranged along the Y-axis direction at intervals, and the fixtures 23 of the two constraint components 20 are on the same axis;

S12: the test piece 30 is mounted on the fixture 23 of two constraint components 20, and the test piece 30 is fixed through two fixtures 23; wherein the two ends of the test piece 30 are equal in the angle index 232 value on the fixture 23 and the relative torsion does not occur;

S13: one of the constraint components 20 is configured as the fixed end, and the other constraint component 20 is configured as the active end, wherein the displacement of the fixed end is kept to zero, and the active end is moved along the X-axis direction and made the test piece 30 to present a two-dimensional bending state;

S14: the Z-axis rotation stage 22 of the active end constraint component 20 is adjusted to correspond to the bending state of the test piece 30;

S15: the bending shape of the test piece 30 is performed reconstruction and data acquisition by computer 300, and compared with the two-dimensional projection curve of the test piece 30 on the optical plate 10 to determine the reduction accuracy of curvature information of the test piece 30;

that is, the test method can test two types of working conditions for the test piece 30; one of which is to fixedly connect the two ends of the test piece 30 at the position where the rotation angle of fixture 23 is a zero degree, and are moved along the X-axis direction through the active end; the other is to fixedly connect the two ends of the test piece 30 at a position where the rotation angle of the fixture 23 is non-zero degrees (for example, 10 degrees), and are moved along the X-axis direction through the active end.

It should be noted that the rotation angle of test piece 30 is based on the position of the FBG test line 210, for example, when the rotation angle is zero degree, the FBG test line 210 is aligned to the 0° of the angle index 232 on the fixture 23; for example, when the rotation angle is a specified angle, the FBG test line 210 is aligned to the specified angle of the angle index 232 on the fixture 23.

Compared with the conventional cantilever beam test device and method, the specific curvature bending of the test piece can be realized by the test method for an FBG curvature sensing test, meanwhile, the rotation angle and torsion angle of the test piece in the two-dimensional bending state can be adjusted, which is conducive to carry out a accuracy compensation test of the two-dimensional bending superposition torsion angle of the test piece; in addition, the method effectively suppresses an axial tension of the test piece and improves the measurement accuracy.

In one example of the present invention, when the angle of the two ends of the test piece 30 on fixture 23 is non-zero, after step S15, it further comprises:

the precision compensation is carried out by computer 300, and compared with the two-dimensional projection curve of the test piece 30 on the optical plate 10 and the curve before precision compensation to determine the reduction accuracy and compensation effect of the curvature information of the test piece 30.

According to a third aspect of the present invention, a test method for an FBG curvature sensing test device 1000 as described above, comprising the following steps:

S21: a position of the two constraint components 20 is adjusted on the optical plate 10, so that the two constraint components 20 are arranged along the Y-axis direction at intervals, and the fixtures 23 of the two constraint components 20 are on the same axis;

S22: the test piece 30 is mounted on fixture 23 of two constraint components 20, and at both ends of the test piece 30, wherein one end is twisted at a specified angle relative to the other end, and both ends of the test piece 30 is fixed by two fixtures 23;

S23: one of the constraint components 20 is configured as the fixed end, and the other constraint component 20 is configured as the active end, wherein the displacement of the fixed end is kept to zero in all directions, and the active end is moved along the X-axis direction and made the test piece 30 to present a two-dimensional bending state and a torsion state;

S24: the Z-axis rotation stage 22 of the active end constraint component 20 is adjusted to correspond to the bending state of the test piece 30;

S25: the bending shape of the test piece 30 is performed reconstruction and data acquisition by computer 300, and compared with the two-dimensional projection curve of the test piece 30 on the optical plate 10 to determine the reduction accuracy of curvature information of the test piece 30;

S26: the precision compensation is carried out by computer 300, and compared with the two-dimensional projection curve of the test piece 30 on the optical plate 10 and the curve before precision compensation to determine the reduction accuracy and compensation effect of the curvature information of the test piece 30.

It should be noted that the rotation angle of test piece 30 is based on the position of the FBG test line 210, for example, when the rotation angle is zero degree, the FBG test line 210 is aligned to the 0° of the angle index 232 on the fixture 23; for example, when the rotation angle is a specified angle, the FBG test line 210 is aligned to the specified angle of the angle index 232 on the fixture 23.

that is, the test method can test two types of working conditions for the test piece 30; one of which is the two ends of the test piece 30, wherein one end is located at the zero-degree position, and the other end is twisted at the specified angle, and the two ends of the test piece 30 are fixed by two fixtures 23, and are moved along the X-axis direction through the active end; the other is the two ends of the test piece 30, wherein one end is located at a non-zero position, and the other end is twisted at the specified angle, and the two ends of the test piece 30 are fixed by two fixtures 23, and are moved along the X-axis direction through the active end.

Compared with the conventional cantilever beam test device and method, the specific curvature bending of the test piece can be realized by the test method for an FBG curvature sensing test, meanwhile, the rotation angle and torsion angle of the test piece in the two-dimensional bending state can be adjusted, which is conducive to carry out a accuracy compensation test of the two-dimensional bending superposition torsion angle of the test piece; in addition, the method effectively suppresses an axial tension of the test piece and improves the measurement accuracy.

It should be noted that the method for curvature compensation of the test piece is as follows:

S10: the torsion angle φ of the test piece is obtained by monitoring a difference value between the two ends of the test piece by an angle sensor; a center wavelength of each grating detection point on the test piece is monitored by the FBG test line 120;

S20: a positive strain $\varepsilon_a$ perceived by the FBG test line 120 is corrected by the computer 300 based on the grating wavelength variation;

S30: the curvature of the test piece subjected to bending and torsion superposition is corrected by computer 300 based on the corrected positive strain $\varepsilon_a$ perceived by the FBG test line 120, and a curvature K of the position of the grating detection point after torsion compensation is obtained.

Specifically, the modified formula for the positive strain of the FBG caused by the bending of the test piece is as follows:

when the test piece is bent and twisted, an FBG array 30 pasted on the substrate of the test piece is expanded, according to a geometric relationship, and the following formula is established:

$$\begin{cases} l_\varepsilon^2 = (l + \varepsilon_a l)^2 + (\varepsilon_t l)^2 \\ l_\varepsilon = l(1 + \varepsilon) \end{cases}$$

in the formula, a length of the FBG test line 120 under the superposition of bending and torsion is $l_\varepsilon$, an axial strain of the FBG is $\varepsilon$, $\varepsilon_a$ is a positive strain generated by the FBG due to the bending of the test piece, and $\varepsilon$ is a shear strain generated by the FBG due to the torsion of the test piece.

Be simplified by joint solution according to the formula:

$$\varepsilon_a = \left[(1 + \varepsilon)^2 - \varepsilon_t^2\right]^{\frac{1}{2}} - 1$$

the axial strain of the FBG is $\varepsilon$, according to the grating wavelength variation, $\Delta\lambda$ can be expressed as:

$$\varepsilon = \frac{\Delta\lambda}{\lambda_B(1 - p_e)}$$

according to the combination of the positive strain $\varepsilon_a$ perceived by the FBG test line 120 of the above sensor and the axial strain $\varepsilon$ of the FBG, the positive strain $\varepsilon_a$ generated by the FBG due to the bending of the test piece can be obtained:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

where, $\varepsilon_t = r\varphi/l$.

The modified formula of the curvature K at the position of the grating detection point 30A after torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

in the formula, r is a distance between the FBG and a centroid, q is a torsion error angle of a scraper conveyor test piece, l is a length of the scraper conveyor test piece, $\Delta\lambda$ is a grating wavelength variation, $\lambda_B$ is an initial wavelength of the FBG, and M is a curvature sensitivity coefficient of the FBG.

It should be noted that $M = (1 - P_e)\lambda_B r$, which is a quantity related to FBG and sensor collection. When the test piece is made and works according to the theoretical conditions, M is a fixed value. Therefore, the formula about M can be simplified as $KM = \Delta\lambda_B$.

SPECIFIC EMBODIMENTS (a) Non-Torsion Two-Dimensional Bending Test of Test Piece 30

Table a is a list of non-torsion two-dimensional bending test parameters of the test piece

| Scheme number | Radius of curvature/m | Rotation error angle/° | Torsion error angle/° |
|---|---|---|---|
| A | 10 | 0 | 0 |

Figure 6:
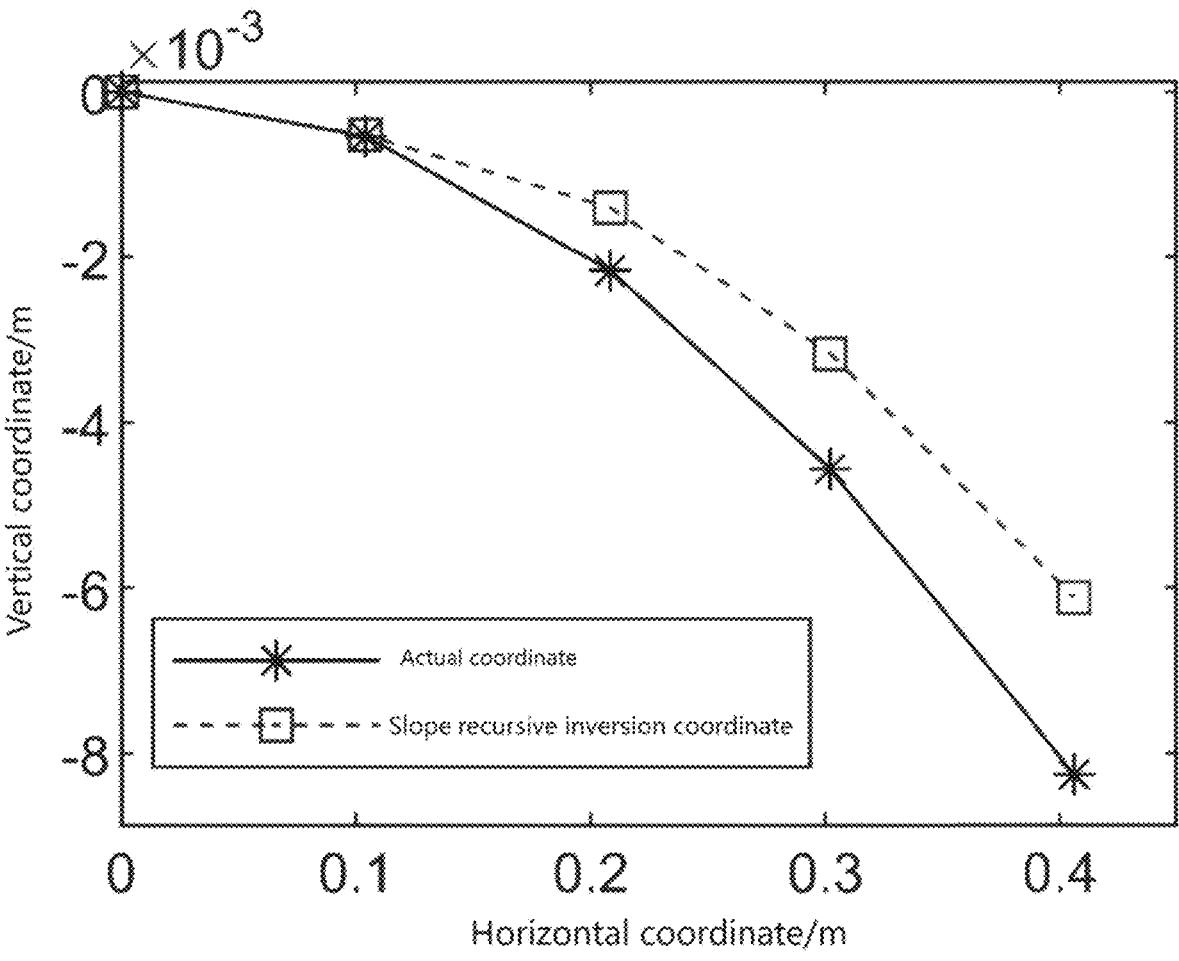
FIG. 6 is a non-rotating and non-twisting slope recursive inversion reconstruction diagram based on the embodiment of the present invention.
Figure 7:
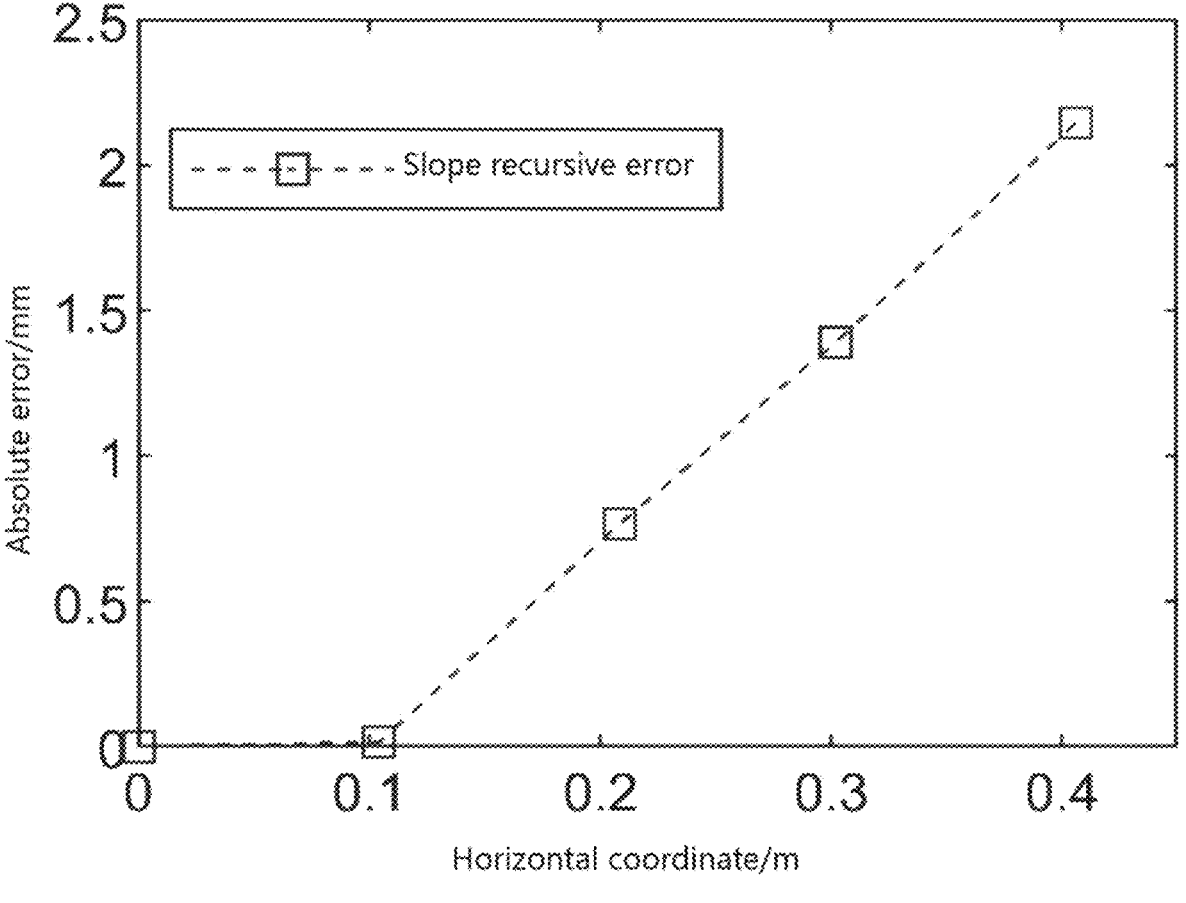
FIG. 7 is a non-rotating and non-twisting slope recursive inversion error diagram based on the embodiment of the present invention.

Scheme A:

From the analysis of FIG. 6 and FIG. 7, it can be seen that based on the surface strain data of fiber FBG sensing substrate, after being converted into discrete curvature information, the shape inversion reconstruction can be realized by a slope recursive algorithm, and the offset at 400 mm position of sensing substrate is determined to be 8.30 mm by two-dimensional projection coordinate reading; even in the case without the rotation error angle and torsion error angle, the absolute error of the inversion curve gradually increases with the increase of the number of recursions, on the sensing substrate with a length of 500 mm, when it is recursive to the position of 400 mm, the absolute error has reached 2.14 mm.

(b) Two-Dimensional Bending+Rotation Test of the Test Piece 30

Table b is a list of two-dimensional bending+rotation test parameters of the test piece

| Scheme number | Radius of curvature/m | Rotation error angle/° | Torsion error angle/° |
|---|---|---|---|
| B1 | 10 | 30 | 0 |
| B2 | 10 | 45 | 0 |

Figure 8:
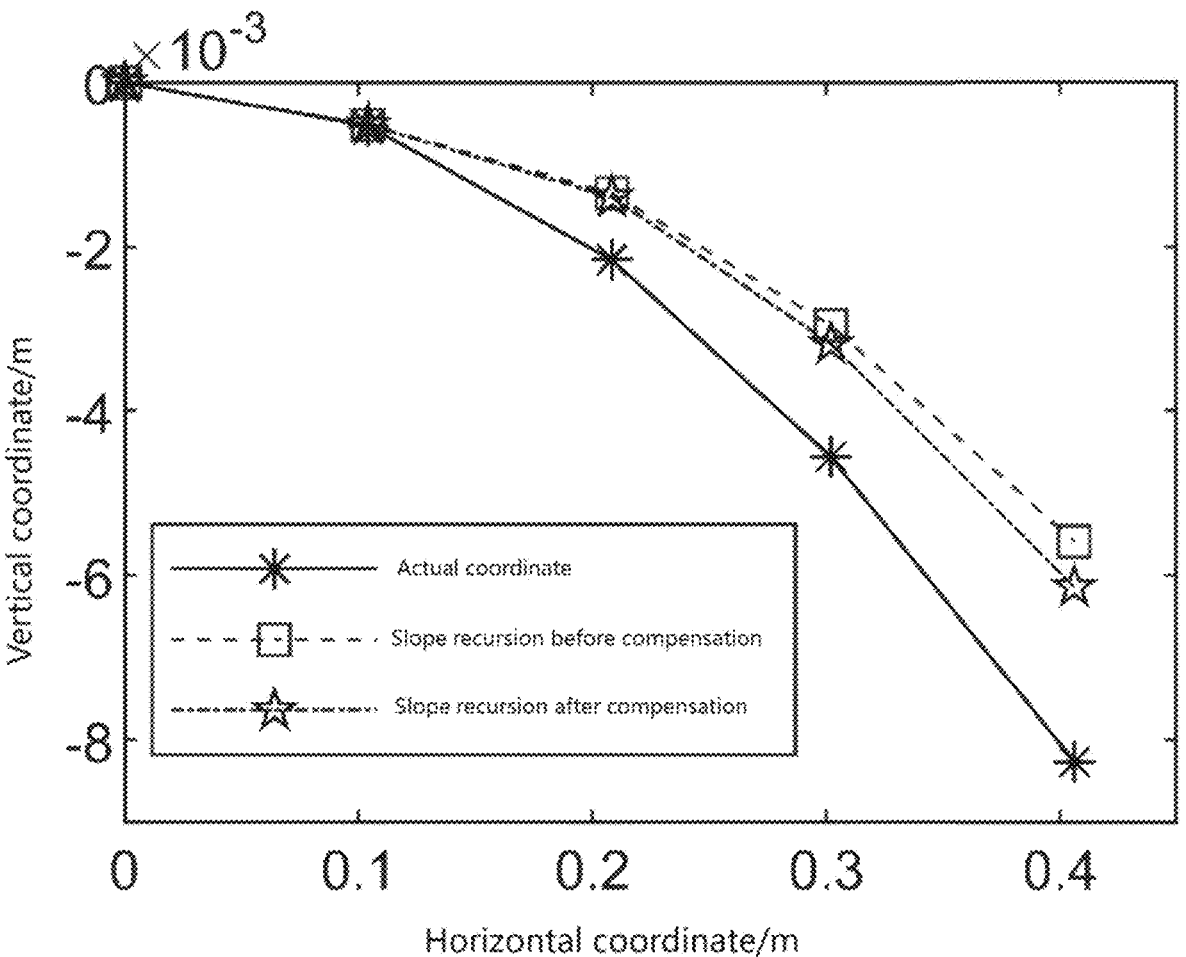
FIG. 8 is a comparison diagram of inversion reconstruction before and after precision compensation when the rotation error angle is 30° of the embodiment of the present invention.
Figure 9:
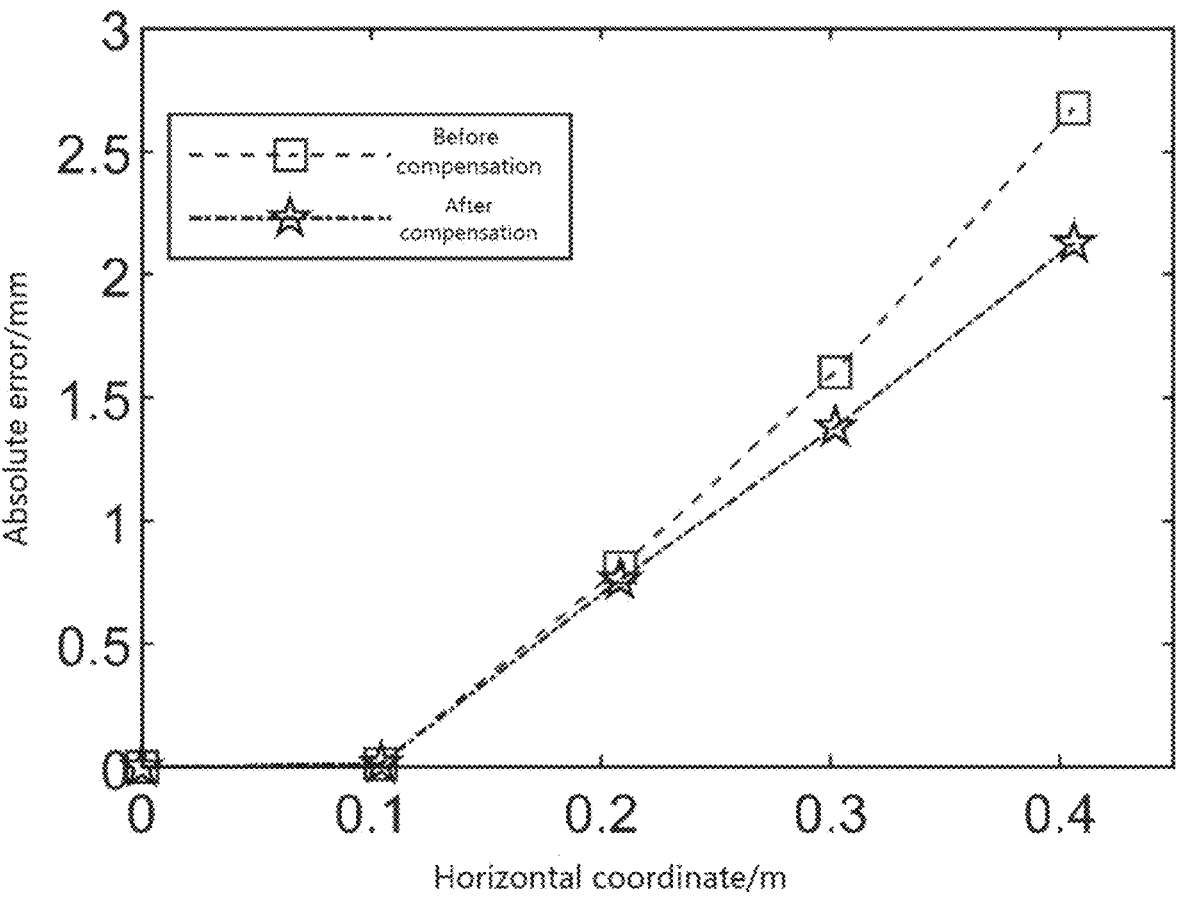
FIG. 9 is a comparison diagram of inversion error before and after precision compensation when the rotation error angle is 30° of the embodiment of the present invention.

(1) Scheme B1:

From the analysis of FIG. 8 and FIG. 9, it can be seen that when the rotation error angle is 30°, the reconstruction curve obtained by the slope recursion of the curvature value compensated by the rotation error angle accuracy compensation model is significantly better than the uncompensated reconstruction curve. The end error of the inversion reconstruction curve before the precision compensation is significantly increased compared with scheme A, and the value is 2.68 mm, after the precision compensation, the end error is 2.12 mm, and the end accuracy of the reconstruction curve is improved by 6.78% compared with that before the precision compensation.

Figure 10:
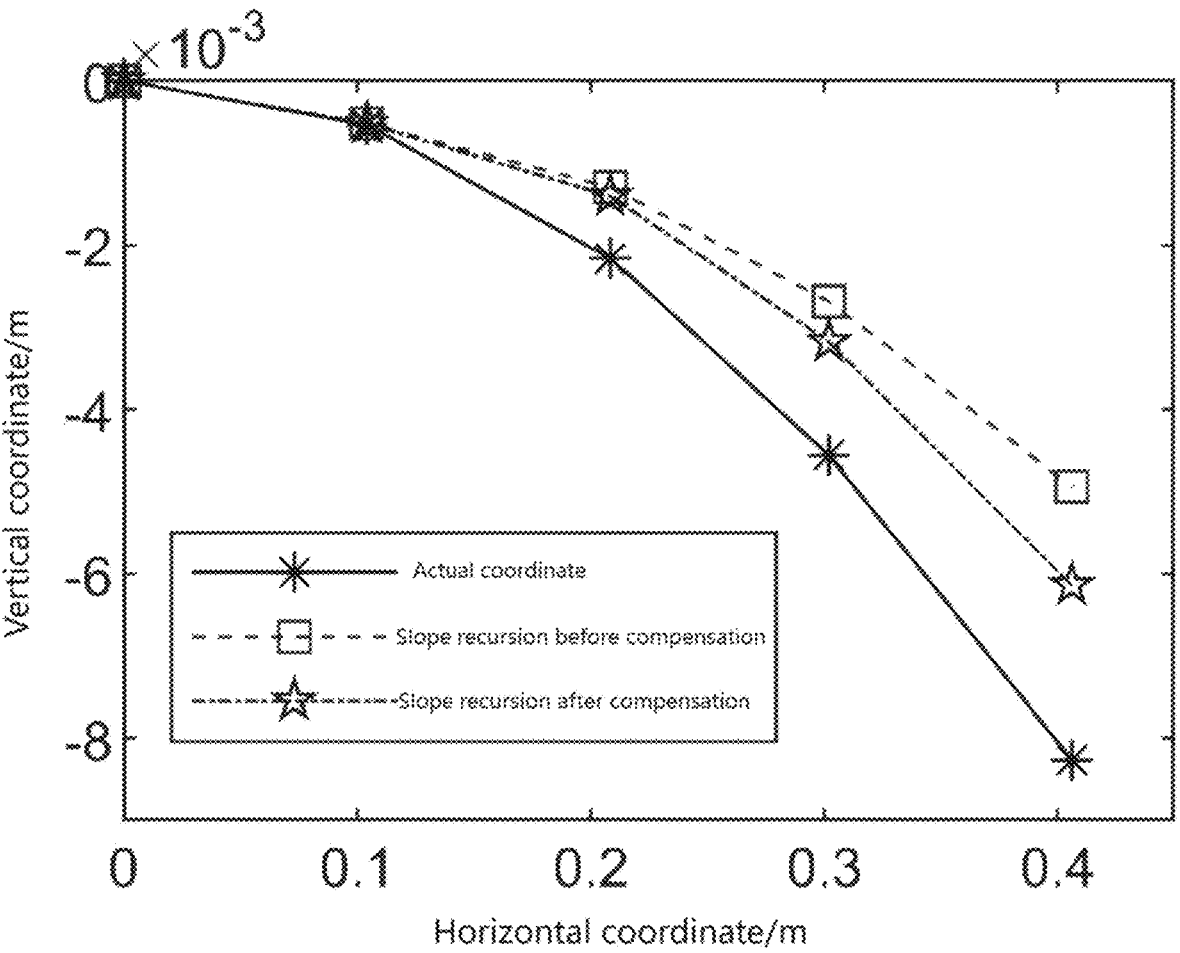
FIG. 10 is a comparison diagram of inversion reconstruction before and after precision compensation when the rotation error angle is 45° of the embodiment of the present invention.
Figure 11:
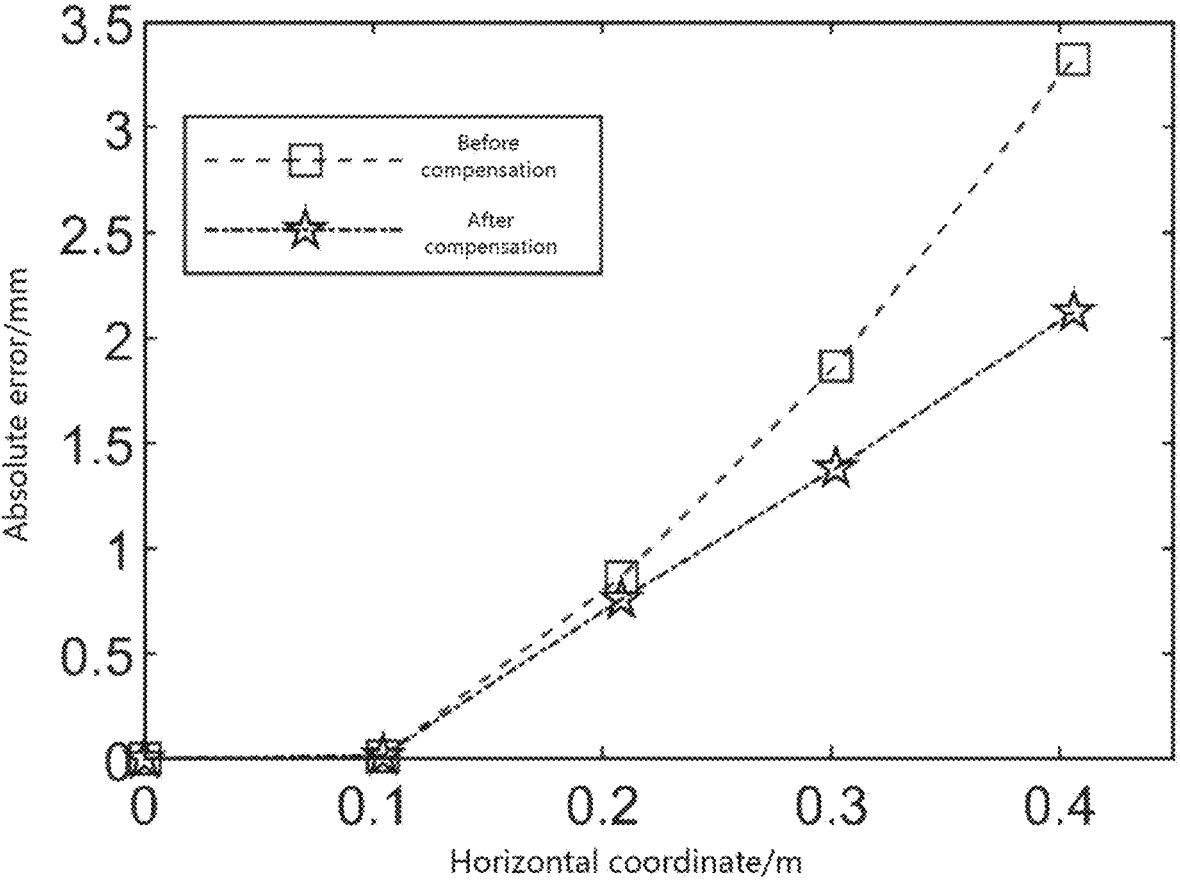
FIG. 11 is a comparison diagram of inversion error before and after precision compensation when the rotation error angle is 45° of the embodiment of the present invention.

(2) Scheme B2:

From the analysis of FIG. 10 and FIG. 11, it can be seen that when the rotation error angle is 45°, the error of the reconstructed curve obtained by the slope recursion of the curvature value after precision compensation is greatly reduced. The end error of the inversion reconstruction curve before the precision compensation is increased compared with scheme A and scheme B1, and the value is 3.33 mm, after the precision compensation, the end error is 2.13 mm, and the end accuracy of the reconstruction curve is improved by 14.46% compared with that before the precision compensation.

(c) Two-Dimensional Bending+Torsion Test of Test Piece 30

Table c is a list of two-dimensional bending+torsion test parameters of the test piece

| Scheme number | Radius of curvature/m | Rotation error angle/° | Torsion error angle/° |
|---|---|---|---|
| C1 | 10 | 0 | 10 |
| C2 | 10 | 0 | 20 |

Figure 12:
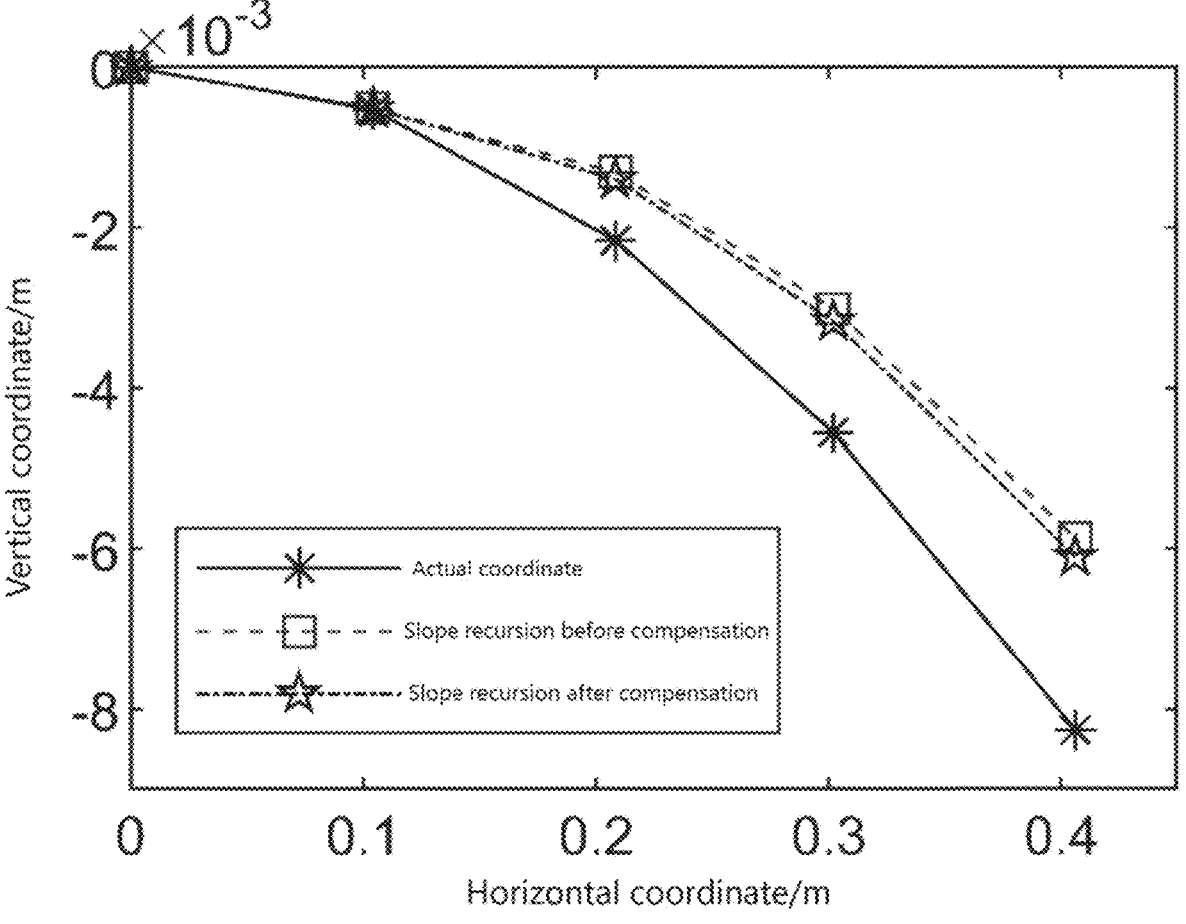
FIG. 12 is a comparison diagram of inversion reconstruction before and after precision compensation when the torsion error angle is 10° of the embodiment of the present invention.
Figure 13:
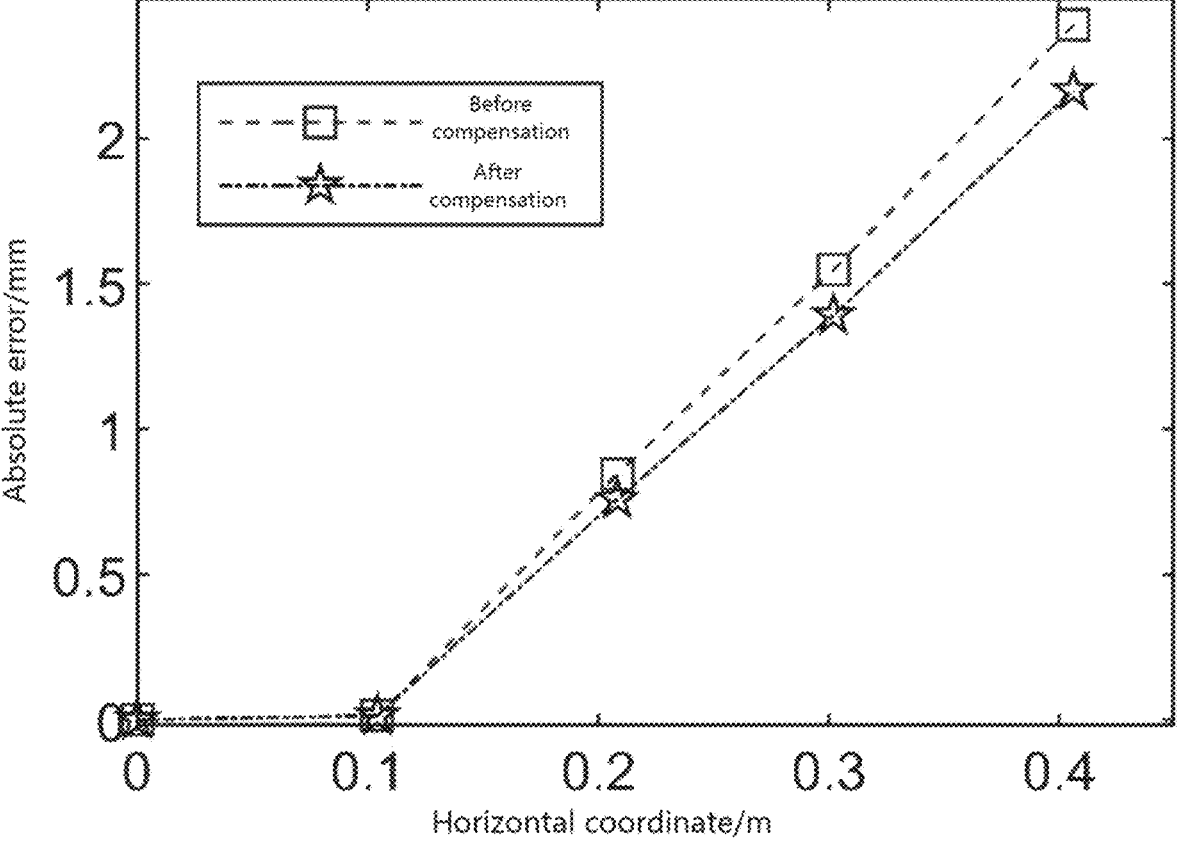
FIG. 13 is a comparison diagram of inversion error before and after precision compensation when the torsion error angle is 10° of the embodiment of the present invention.

(1) Scheme C1:

From the analysis of FIG. 12 and FIG. 13, it can be seen that when the torsion error angle is 10°, the reconstruction curve obtained by the slope recursion of the curvature value compensated by the torsion error angle accuracy compensation model is significantly better than the uncompensated reconstruction curve. The end error of the inversion reconstruction curve before the precision compensation is significantly increased compared with scheme A, and the value is 2.39 mm, after the precision compensation, the end error is 2.16 mm, and the end accuracy of the reconstruction curve is improved by 2.77% compared with that before the precision compensation.

Figure 14:
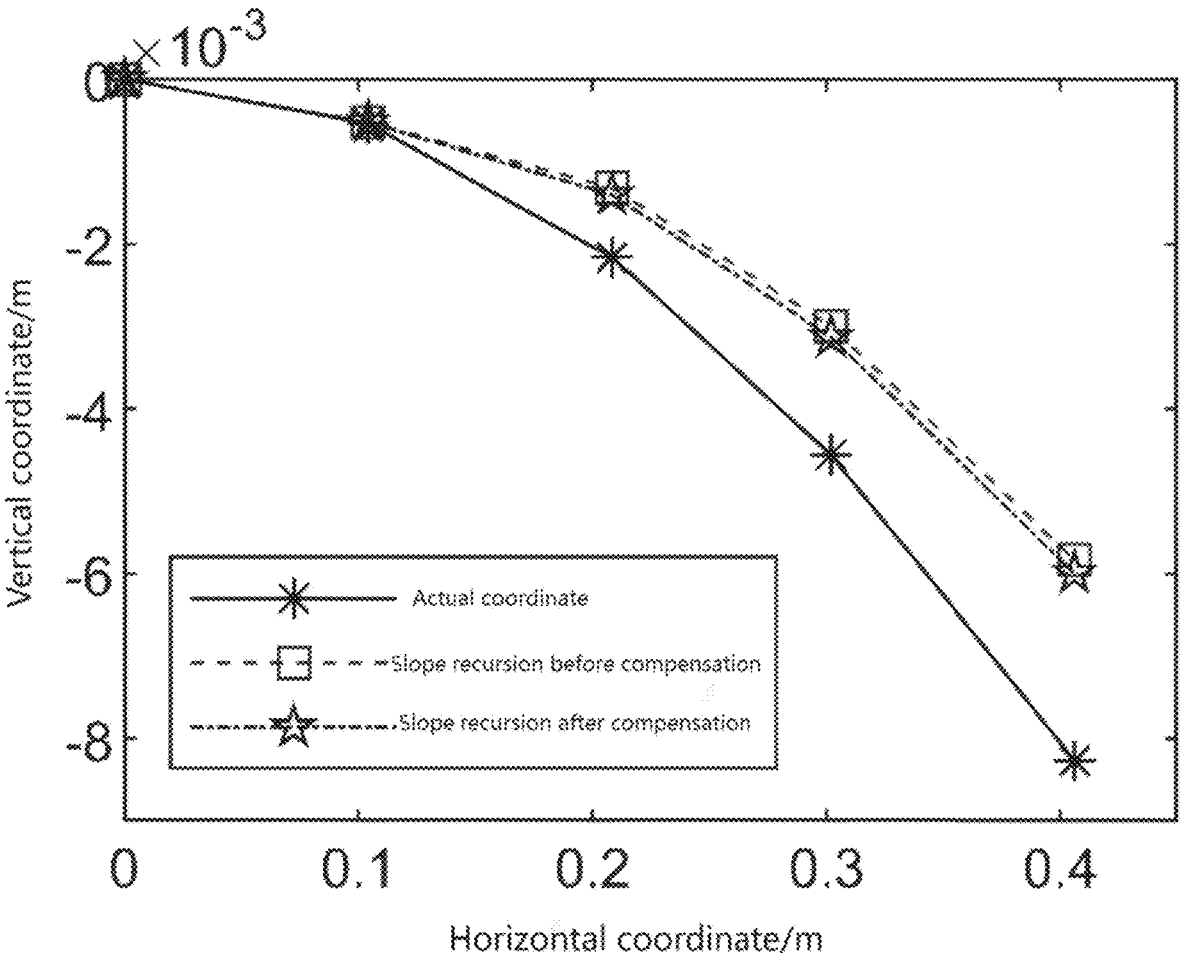
FIG. 14 is a comparison diagram of inversion reconstruction before and after precision compensation when the torsion error angle is 20° of the embodiment of the present invention.
Figure 15:
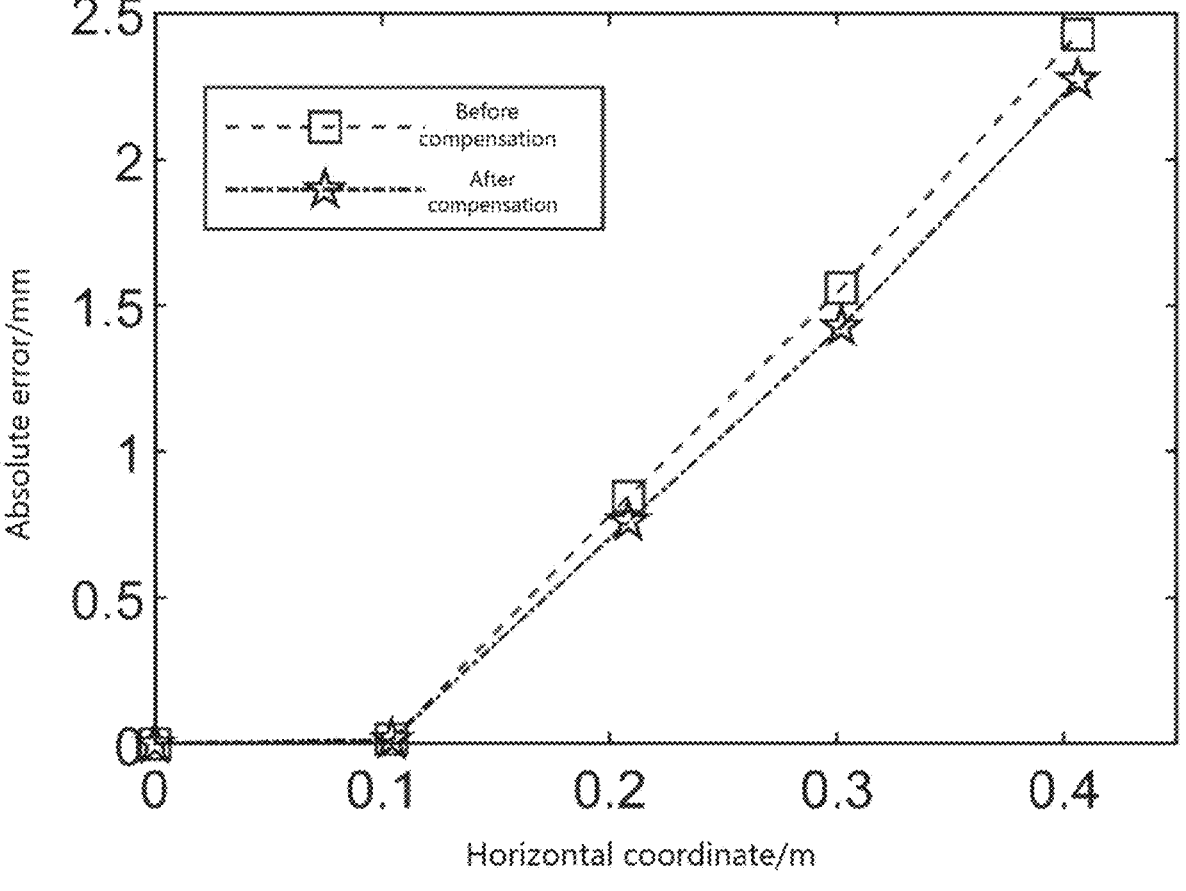
FIG. 15 is a comparison diagram of inversion error before and after precision compensation when the torsion error angle is 20° of the embodiment of the present invention.

(1) Scheme C2:

From the analysis of FIG. 14 and FIG. 15, it can be seen that when the torsion error angle is 20°, the error of the reconstructed curve obtained by the slope recursion of the curvature value after precision compensation is reduced. The end error of the inversion reconstruction curve before the precision compensation is increased compared with scheme A and scheme C1, and the value is 2.43 mm, after the precision compensation, the end error is 2.27 mm, and the end accuracy of the reconstruction curve is improved by 1.93% compared with that before the precision compensation.

In the above, the demonstration implementation method of the FBG curvature sensing test device 1000 and the test method thereof proposed by the present invention is described in detail with reference to the preferred embodiments. However, the technical personnel in this field can understand that under the premise of not deviating from the concept of the present invention, a variety of variants and modifications can be made to the above specific embodiments, and various technical features and structures proposed by the present invention can be combined in a variety of ways, without exceeding the scope of protection of the present invention. The scope of protection of the present invention is determined by the attached claims.

What is claimed is:

1. A fiber Bragg grating (FBG) curvature sensing test device, comprising:

a test platform, wherein the test platform comprises an optical plate and two constraint components arranged at two relative positions on the optical plate along a Y-axis direction, test pieces are connected between the two constraint components, wherein each of the two constraint component comprises an X-axis displacement stage, a Z-axis rotation stage and a fixture, wherein the X-axis displacement stage is connected to the optical plate and is allowed to move along an X-axis direction, a first end of the Z-axis rotation stage is connected to the X-axis displacement stage, and a second end of the Z-axis rotation stage is connected to the fixture, and is configured to drive the fixture to rotate around a Z-axis direction, the fixture is configured as a fixed connection to the test piece; the test piece is an elastic material piece; wherein an angle index is formed in a circumferential direction of the fixture, when the test piece is fixedly mounted between two fixtures, both ends of the test piece are allowed to be fixed at a specified torsion angle and/or rotation angle;

an FBG demodulator, wherein the FBG demodulator is connected to a surface of the test piece through an FBG test line, and is configured to convert an optical signal of a wavelength change monitored by the FBG test line based on a deformation of the test piece into an electrical signal; and a computer, wherein the computer is coupled to the FBG demodulator, and is configured to receive the electrical signal converted by the FBG demodulator, and performs reconstruction and data acquisition of a bending shape of the test piece;

wherein the X-axis direction, the Y-axis direction and the Z-axis direction are perpendicular to each other.

2. The FBG curvature sensing test device according to claim 1, wherein the Z-axis rotation stage comprises:

a base, wherein the base is fixedly connected to the X-axis displacement stage;

a rotating disc, wherein the rotating disc is allowed to be pivotally connected to the base, and the fixture is fixedly connected to the rotating disc;

a driving member, wherein the driving member is connected to the rotating disc and configured to drive the rotating disc in a rotational movement relative to the base.

3. The FBG curvature sensing test device according to claim 2, wherein the driving member comprises:

a screw and a first connecting block, wherein the first connecting block is fixedly connected to the screw;

a threaded hole is formed on the base, and the screw is adapted to the threaded hole;

wherein a driving shaft is fixed on the rotating disc, and a first slot matching the driving shaft is arranged along a circumferential direction of the first connecting block.

4. The FBG curvature sensing test device according to claim 2, wherein the driving member comprises:

a sliding rod and a second connecting block, wherein the second connecting block is fixedly connected to the sliding rod, and a convex part is arranged on the sliding rod; wherein the driving shaft is fixed on the rotating disc, and a second slot is arranged on the second connecting block to adapt to the driving shaft;

a sliding rail is formed on the base, and a plurality of concave parts are arranged inside the sliding rail, and the convex part is clamped to any of the plurality of concave parts in the sliding rail.

5. The FBG curvature sensing test device according to claim 2, wherein the Z-axis rotation stage further comprises:

a limiting member, wherein the limiting member is connected between the base and the rotating disc and configured to be allowed for a switching movement between a first position limiting a rotational movement of the rotating disc relative to the base and a second position releasing the rotational movement of the rotating disc relative to the base.

6. The FBG curvature sensing test device according to claim 1, wherein the FBG test line is arranged along an extension direction of the test piece, and a plurality of grating detection points are formed on a surface of the test piece by bonding a binder at equal intervals.

7. A test method for the FBG curvature sensing test device according to claim 5, comprising the following steps:

S11: adjusting a position of the two constraint components on the optical plate, wherein the two constraint components are arranged along the Y-axis direction at intervals, and the fixtures of the two constraint components are on an identical axis;

S12: mounting the test piece on the fixture of the two constraint components, and fixing the test piece through two fixtures; wherein two ends of the test piece are equal in an angle index value on the fixture and a relative torsion does not occur;

S13: configuring a first one of the two constraint components as a fixed end, and configuring a second one of the two constraint components as an active end, wherein a displacement of the fixed end is kept to zero in all directions, and moving the active end along the X-axis direction and making the test piece to present a two-dimensional bending state;

S14: adjusting the Z-axis rotation stage of the second one of the two constraint components to correspond to the two-dimensional bending state of the test piece;

S15: performing the reconstruction and data acquisition of the bending shape of the test piece by the computer, and comparing with a two-dimensional projection curve of the test piece on the optical plate to determine a reduction accuracy of curvature information of the test piece.

8. The test method according to claim 7, wherein when an angle of the two ends of the test piece on the fixture is non-zero, after step S15, the test method further comprises:

carrying out a precision compensation by the computer, and comparing with the two-dimensional projection curve of the test piece on the optical plate and a curve before precision compensation to determine the reduction accuracy and compensation effect of the curvature information of the test piece.

9. A test method for the FBG curvature sensing test device according to claim 1, comprising the following steps:

S21: adjusting a position of the two constraint components on the optical plate, wherein the two constraint components are arranged along the Y-axis direction at intervals, and the fixtures of the two constraint components are on an identical axis;

S22: mounting the test piece on the fixture of the two constraint components, and at both ends of the test piece, wherein twisting a first end at a specified angle relative to a second end, and fixing the both ends of the test piece by two fixtures;

S23: configuring a first one of the two constraint components as a fixed end, and configuring a second one of the two constraint components as an active end, wherein a displacement of the fixed end is kept to zero in all directions, and moving the active end along the X-axis direction and making the test piece to present a two-dimensional bending state and a torsion state;

S24: adjusting the Z-axis rotation stage of the second one of the two constraint components to correspond to the two-dimensional bending state of the test piece;

S25: performing the reconstruction and data acquisition of the bending shape of the test piece by the computer, and comparing with a two-dimensional projection curve of the test piece on the optical plate to determine a reduction accuracy of curvature information of the test piece;

S26: carrying out a precision compensation by the computer, and comparing with the two-dimensional projection curve of the test piece on the optical plate and a curve before precision compensation to determine the reduction accuracy and compensation effect of the curvature information of the test piece.

10. The test method according to claim 9, wherein in the FBG curvature sensing test device, the Z-axis rotation stage comprises:

a base, wherein the base is fixedly connected to the X-axis displacement stage;

a rotating disc, wherein the rotating disc is allowed to be pivotally connected to the base, and the fixture is fixedly connected to the rotating disc;

a driving member, wherein the driving member is connected to the rotating disc and configured to drive the rotating disc in a rotational movement relative to the base.

11. The test method according to claim 10, wherein in the FBG curvature sensing test device, the driving member comprises:

a screw and a first connecting block, wherein the first connecting block is fixedly connected to the screw;

a threaded hole is formed on the base, and the screw is adapted to the threaded hole;

wherein a driving shaft is fixed on the rotating disc, and a first slot matching the driving shaft is arranged along a circumferential direction of the first connecting block.

12. The test method according to claim 10, wherein in the FBG curvature sensing test device, the driving member comprises:

a sliding rod and a second connecting block, wherein the second connecting block is fixedly connected to the sliding rod, and a convex part is arranged on the sliding rod; wherein the driving shaft is fixed on the rotating disc, and a second slot is arranged on the second connecting block to adapt to the driving shaft;

a sliding rail is formed on the base, and a plurality of concave parts are arranged inside the sliding rail, and the convex part is clamped to any of the plurality of concave parts in the sliding rail.

13. The test method according to claim 10, wherein in the FBG curvature sensing test device, the Z-axis rotation stage further comprises:

a limiting member, wherein the limiting member is connected between the base and the rotating disc and configured to be allowed for a switching movement between a first position limiting a rotational movement of the rotating disc relative to the base and a second position releasing the rotational movement of the rotating disc relative to the base.

14. The test method according to claim 9, wherein in the FBG curvature sensing test device, the FBG test line is arranged along an extension direction of the test piece, and a plurality of grating detection points are formed on a surface of the test piece by bonding a binder at equal intervals.

\* \* \* \* \*